(12) United States Patent
Haag et al.

(10) Patent No.: US 6,190,047 B1
(45) Date of Patent: Feb. 20, 2001

(54) BASE BEAM FOR USE IN FRAMEWORKS FOR MOUNTING WORKPIECES TO BE MEASURED

(75) Inventors: Jürgen Haag; Josef Lauer, both of Püttlingen; Klaus Haage, Wadgassen, all of (DE)

(73) Assignee: KOMEG Industrielle Messtechnik GmbH, Völklingen (DE)

( * ) Notice: Under 35 U.S.C. 154(b), the term of this patent shall be extended for 0 days.

(21) Appl. No.: 09/263,043

(22) Filed: Mar. 5, 1999

(30) Foreign Application Priority Data

Mar. 6, 1998 (DE) ............................................... 198 10 771

(51) Int. Cl.[7] ..................................................... F16C 29/00
(52) U.S. Cl. .................................. 384/55; 384/42; 384/49; 384/50; 269/73; 269/76; 104/118
(58) Field of Search ................................. 384/55, 50, 49, 384/42; 269/73, 76; 104/118

(56) References Cited

U.S. PATENT DOCUMENTS

| | | | |
|---|---|---|---|
| 4,775,247 | * 10/1988 | Isert | 384/43 |
| 5,247,891 | * 9/1993 | Morita | 104/246 |
| 5,249,867 | * 10/1993 | Iida | 384/45 |
| 5,265,963 | * 11/1993 | Kawaguchi | 384/43 |
| 5,431,498 | * 7/1995 | Lyon | 384/45 |
| 5,568,982 | * 10/1996 | Stoll et al. | 384/55 |
| 5,735,214 | * 4/1998 | Tsuboi | 105/29.1 |
| 5,984,291 | * 11/1999 | Iwata et al. | 269/73 |

FOREIGN PATENT DOCUMENTS 35 27 307 C2    4/1986 (DE) .

\* cited by examiner

*Primary Examiner*—S. Joseph Morano
*Assistant Examiner*—Frantz F. Jules
(74) *Attorney, Agent, or Firm*—Henry M. Feiereisen

(57) ABSTRACT

A base beam for formation of a horizontal and vertical, rod-like framework for use in clamping workpieces to be measured, includes a main body defined by a substantially square cross section and having drawn-in flanks formed centrally with a rib, and a carriage detachably securable on the main body for displacement longitudinally in direction of the main body, with the carriage having at least one side formed with one or more precision bores.

8 Claims, 6 Drawing Sheets

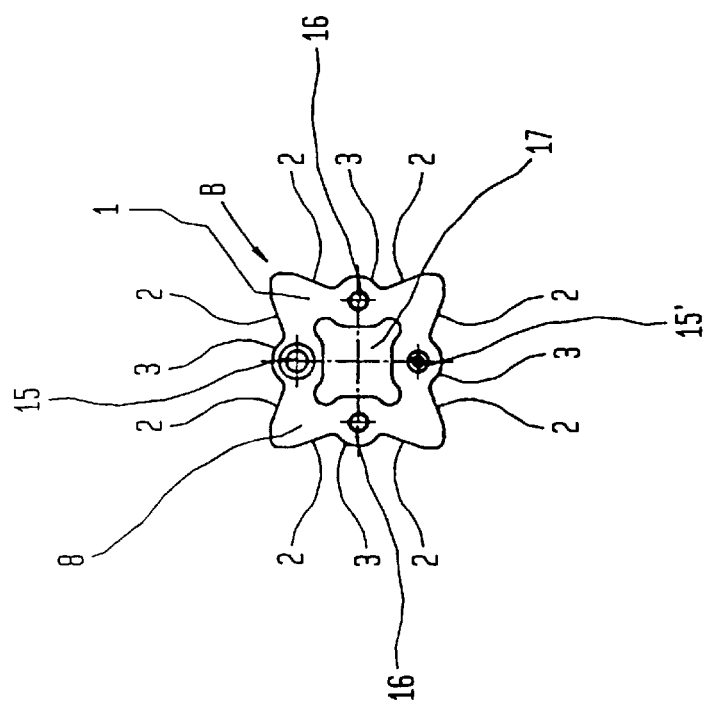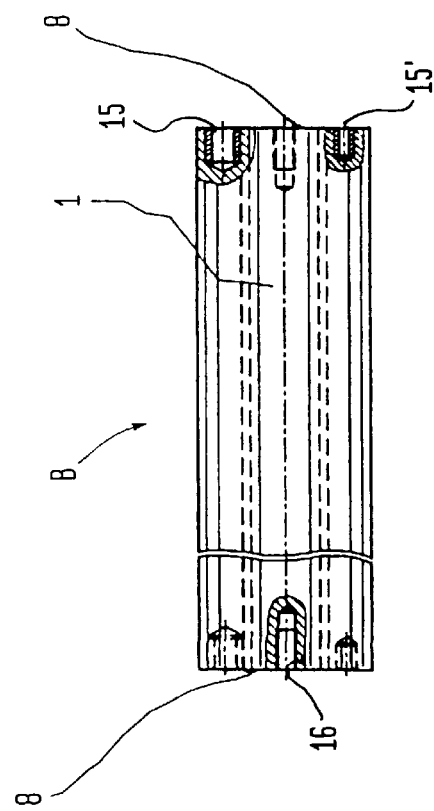

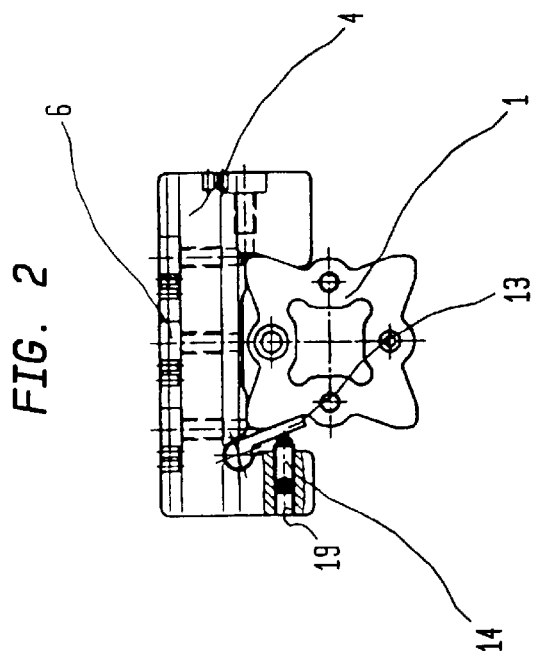
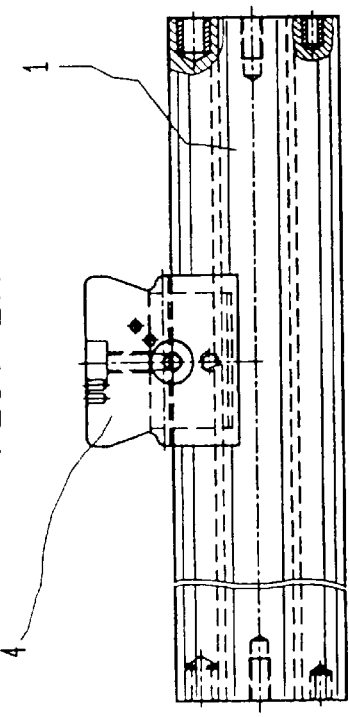
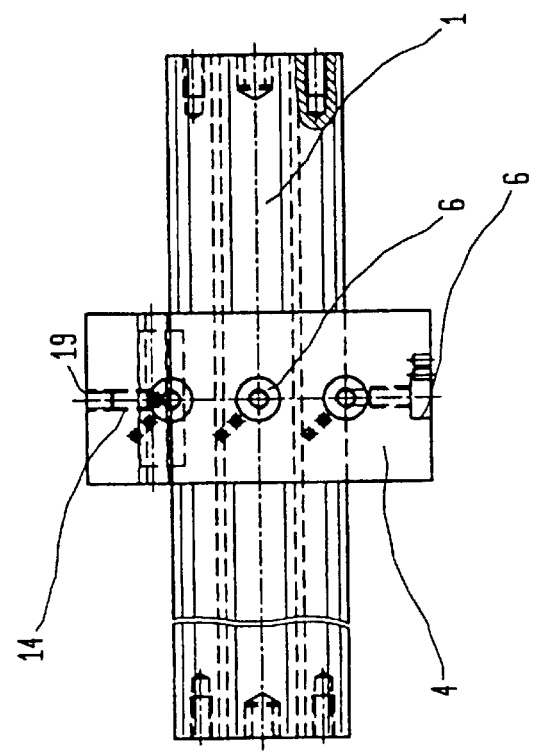

BASE BEAM FOR USE IN FRAMEWORKS FOR MOUNTING WORKPIECES TO BE MEASURED

CROSS-REFERENCES TO RELATED APPLICATIONS

This application claims the priority of German Patent Application Serial No. 198 10 771.4-15, filed Mar. 6, 1998, the subject matter of which is incorporated herein by reference.

BACKGROUND OF THE INVENTION

The present invention relates, in general to frameworks, and more particularly to a base beam for use in realization of a horizontal and vertical, rod-like framework for clamped attachment of workpieces to be measured.

Conventional clamping systems for attachment of workpieces in the measuring technique typically utilize in addition to base plates primarily precision-bored beams which are used for realizing a basic vertical and horizontal framework and oftentimes are of great length. These precision-bored beams are formed with a continuous raster of bores. These bores as well as the spacing between the bores are manufactured at high precision so that the overall costs of such precision-bored beams are substantial.

The provision for such expensive precision-bored beams with the plurality of precision bores, however, is frequently not required, in particular in situations where a user has a need for precision bores only at the ends or in the center of the precision-bored beams. In these situations, the provision of the other precision bores is redundant.

SUMMARY OF THE INVENTION

It is thus an object of the present invention to provide an improved framework, obviating the afore-stated drawbacks.

In particular, it is an object of the present invention to provide an improved framework of horizontal and vertical structure which can be suited to a customer's needs and is more flexible with respect to the clamping task and thus more cost-efficient, without adversely affecting a required precision.

These objects, and others which will become apparent hereinafter, are attained in accordance with the present invention by providing a base beam having a main body which is defined by a substantially square cross section and has drawn-in flanks formed centrally with a rib, whereby the base beam is complemented by a first carriage which is detachably securable on the main body for displacement longitudinally in direction of the main body, with the carriage having at least one side formed with one or more precision bores.

Suitably, a second carriage is so associated to the first carriage as to be movable transversely to the base beam, with the second carriage also having at least one side formed with one or more precision bores.

According to another feature of the present invention, a connector kit is provided which is attachable to at least one end face of the main body for coupling the base beam to a conventional precision-bored beam.

According to still another feature of the present invention, each of the first and second carriages has a bottom side of half-dovetailed configuration, with a clamping mechanism disposed in the bottom and including a swingable clamping member for cooperation with one or more screw fasteners.

Through the provision of a base beam according to the present invention, a framework can be established which can be suited to the customer's needs in a highly cost-efficient manner, e.g. for purposes of precise clamping and subsequently measuring of workpieces.

BRIEF DESCRIPTION OF THE DRAWING

The above and other objects, features and advantages of the present invention will now be described in more detail with reference to the accompanying drawing, in which:

FIG. 1 is a front view of a base beam according to the present invention;

FIG. 1a is a partially sectional, side view of the base beam of FIG. 1;

FIG. 2 is a front view of the base beam of FIG. 1 in conjunction with an attached carriage;

FIG. 2a is a partially sectional, side view of the assembly of base beam and carriage of FIG. 2;

FIG. 2b is a partially sectional, top view of the assembly of base beam and carriage;

DETAILED DESCRIPTION OF PREFERRED EMBODIMENTS

Figure 3:
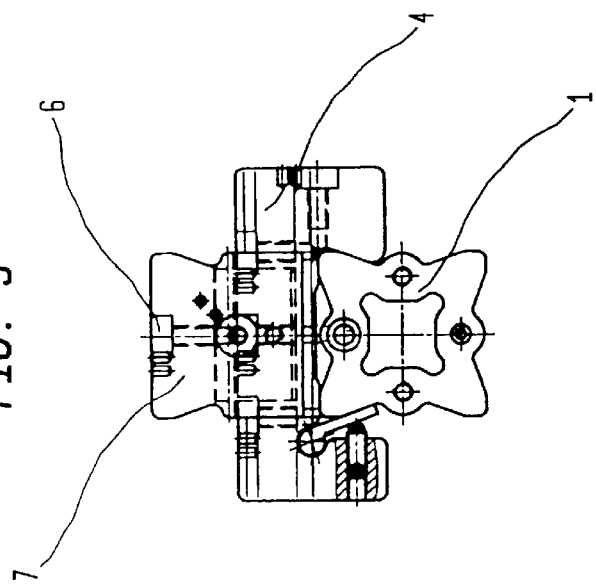
FIG. 3 is a front view of the base beam of FIG. 1 in conjunction with two attached carriages.

Throughout all the Figures, same or corresponding elements are generally indicated by same reference numerals.

Turning now to the drawing, and in particular to FIGS. 1 and 1a, there are shown a frontal view and a side view of a base beam, generally designated by reference character B and including an elongated hollow main body 1 which is of substantially square cross section and formed with a central hole 17. The main body 1 is formed on each side thereof with inwardly directed converging flanks 2 which terminate in a central rib 3 extending longitudinally along the main body 1. The main body 1 has opposite end faces 8 which have formed therein bores 15 and 15' of different sizes, and threaded bores 16 in the area of the ribs 3, to allow attachment of the base beam B to other beams, such as precision-bored beams formed with a raster of precisely formed and spaced-apart bores 6, through use of a suitable connection kit 9, as shown, for example, in FIG. 6. Suitably, the main body 1 is made through extrusion.

Figure 4:
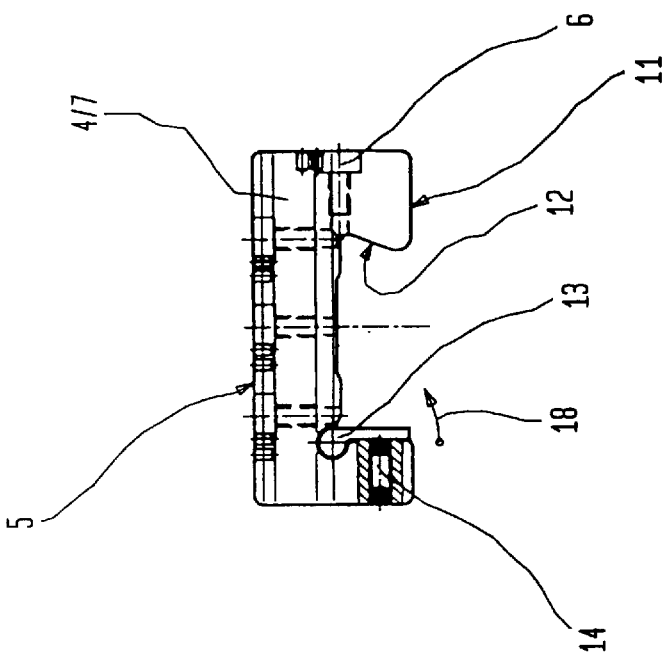
FIG. 4 is a front view of the carriage of FIG. 2.
Figure 5:
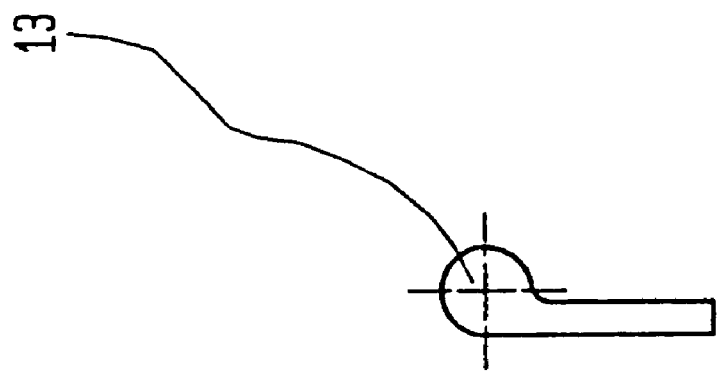
FIG. 5 is a schematic illustration of a clamping member for securement of a carriage.
Figure 5A:
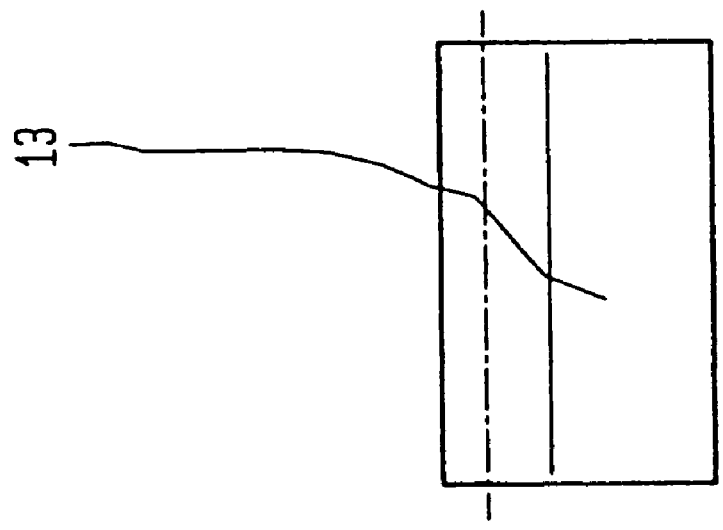
FIG. 5a is a schematic side view of the clamping member of FIG. 5.
Figure 6:
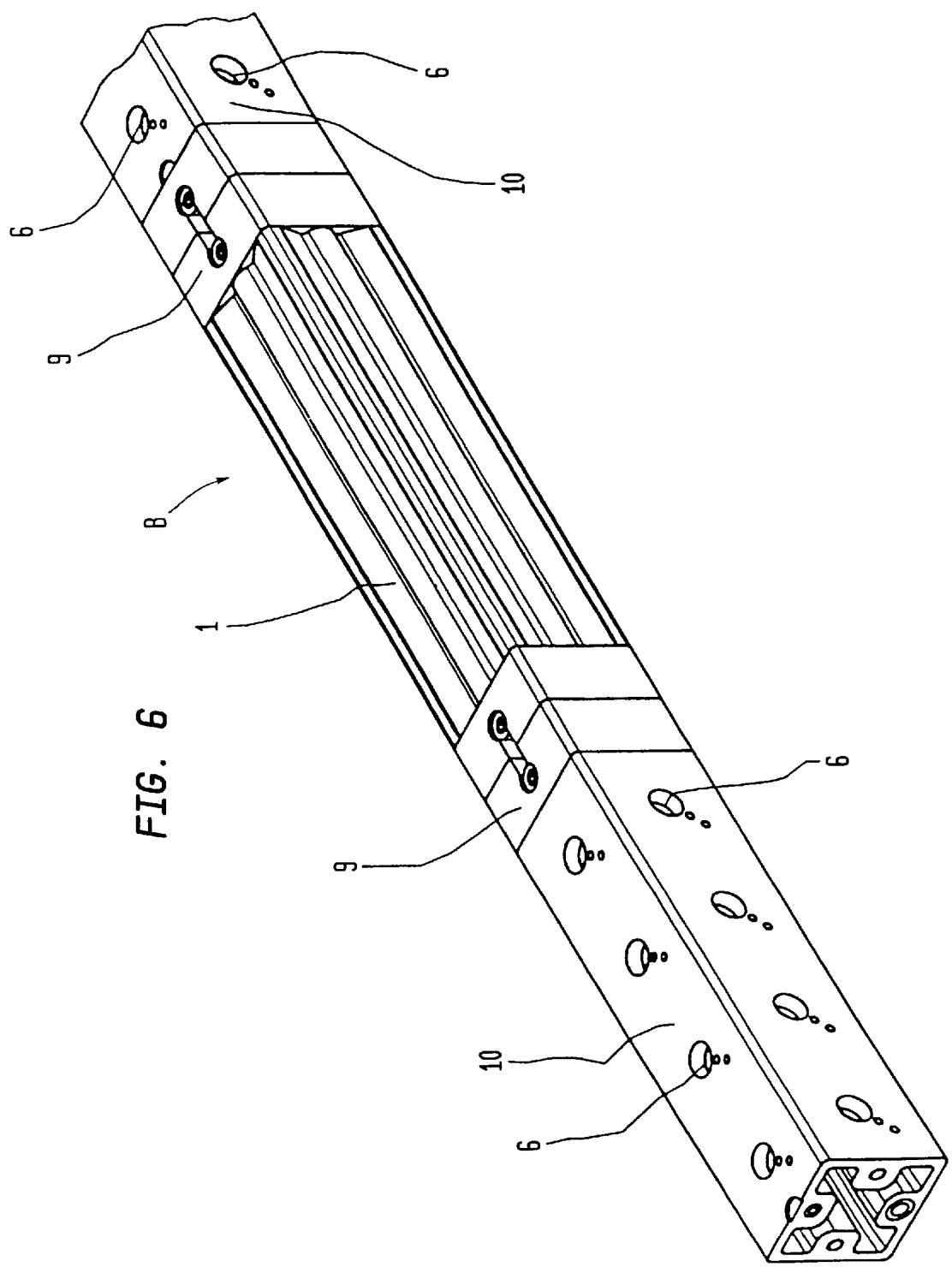
FIG. 6 is a top and side perspective view of a fragmentary framework comprised of a base beam according to the present invention and other conventional elongated, rod-like beams.

Unlike conventional precision-bored beams, shown in FIG. 6 by way of example and labeled by reference numeral 10, the base beam B does not have any precision bores 6 for attachment of a workpiece. However, in order to permit precise attachment of a workpiece to the base beam B of the present invention as well, a carriage 4 is provided which can be detachably mounted at any suitable location onto the main body 1, as shown in FIGS. 2, 2a and 2b. The carriage 4 is of generally U-shaped configuration (cf. FIG. 4) so as to be placeable over one flank 2 of the main body 1. On its main body distal side 5, the carriage 4 is formed with one or more precisely shaped and spaced-apart bores 6 for attachment of a workpiece. As best seen in FIG. 2, the carriage 4 is secured to the main body 1 by a clamping member 13 (cf. also FIGS. 5 and 5a) which is pivotally mounted at the underside 11 of the carriage 4 for rotation inwardly toward the main body 1 in direction of arrow 18 (FIG. 4). The inward rotation of the clamping member 13 is realized by one or more screw fasteners 14 which are received in respective throughbores 19 that are accessible from outside to allow engagement of an appropriate tool (not shown). By screwing the screw fastener or screw fasteners 14 inwardly, the clamping member 14 is urged against the confronting flank 2 of the main body 1 to secure the carriage 4.

Figure 3A:
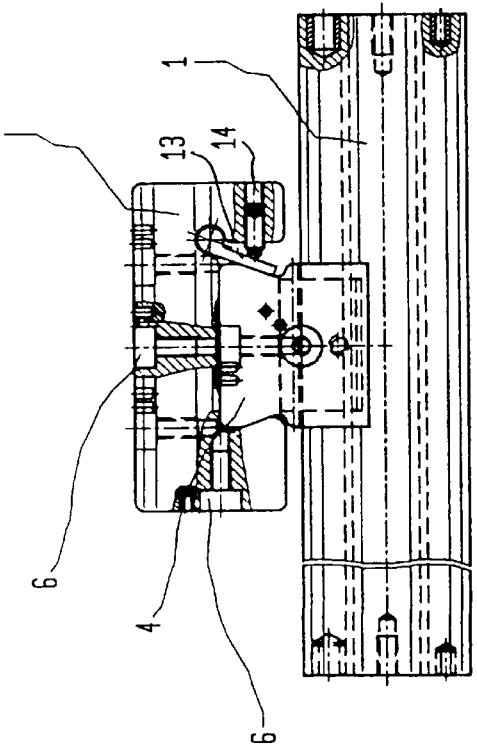
FIG. 3a is a partially sectional, side view of the assembly of base beam and two carriages of FIG. 3.
Figure 3B:
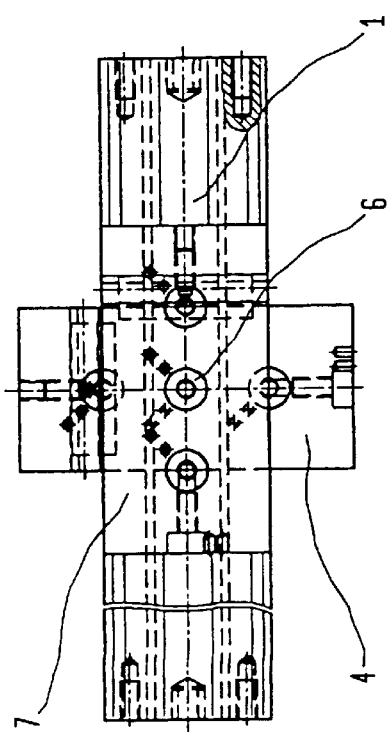
FIG. 3b is a partially sectional, top view of the assembly of base beam and two carriages.

The carriage 4 can be displaced longitudinally along the main body 1 and is so dimensioned as to permit a second carriage 7 which is also formed with precision bores 6 to be placed over the main body distal side of the carriage 4. This configuration is shown in particular in FIGS. 3, 3a and 3b, and allows certain mounting tasks that require a displacement in a transverse direction and thus vertical with respect to the base beam B. The securement of the carriage 7 to the carriage 4 is realized in a same manner as the securement of the carriage 4 to the main body 1 of the base beam B, and thus includes a clamping 13 which is urged by one or more screw fasteners 14 against a confronting wall of the carriage 4.

Figure 4A:
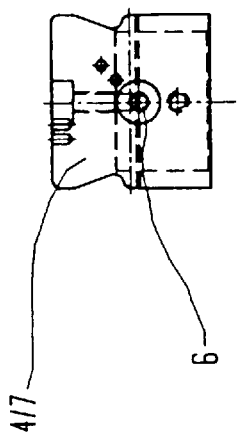
FIG. 4a is a side view of the carriage of FIG. 4.
Figure 4B:
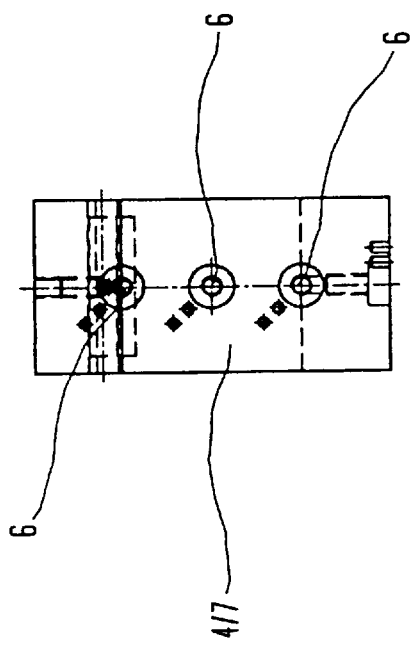
FIG. 4b is a top view of the carriage of FIG. 4.

The carriages 4 and 7 are of identical design and are shown in FIGS. 4, 4a and 4b, without illustration of the base beam B. The clamping member 13 is disposed in the recess at the underside 11 which is of half-dovetail configuration, whereby the other half of the dovetail is formed by the clamping member 13, when the carriage 4; 7 is placed accordingly, and the clamping member 13 is rotated inwardly by the screw fastener 14.

Turning now to FIG. 6, there is shown a top and side perspective view of a fragmentary framework comprised of a base beam B according to the present invention and other conventional elongate precision-bored beams 10 to illustrate a situation in which precision bores 6 are needed only at certain locations. The base beam B is shown without carriages 4, 7 and thus does not exhibit any precision bores 6. Each axial end face 8 of the base beam B is linked by a connection kit 9 to a confronting end face of a precision-bored beam 10 which is formed with precision bores 6. The framework of FIG. 6 is shown by way of example only. Certainly, the configuration may differ to suit other clamping tasks. For example, the base beam B may require the use of one or more of the detachably secured carriages 4, 7 to permit attachment of respective workpieces.

While the invention has been illustrated and described as embodied in a base beam for use in frameworks for mounting workpieces to be measured, it is not intended to be limited to the details shown since various modifications and structural changes may be made without departing in any way from the spirit of the present invention.

What is claimed as new and desired to be protected by Letters Patent is set forth in the appended claims:

1. A framework; comprising:
    a first beam provided with precision bores at predetermined locations for attachment of a workpiece;
    a second beam defined by a substantially square cross section and having drawn-in flanks formed centrally with a rib;
    a carriage detachably securable to the second beam for displacement longitudinally in direction of the second beam, said carriage having at least one side formed with at least one precision bore to allow attachment of a workpiece; and
    connection means for securing the second beam to the first beam.

2. The framework of claim 1, and further comprising a second carriage detachably secured to the carriage for displacement transversely to the second beam, said second carriage having at least one side formed with at least one bore to allow attachment of a workpiece.

3. The framework of claim 2, and further comprising a clamping mechanism for detachably securing the second carriage to the first carriage, said clamping mechanism including a clamping member swingably mounted to the second carriage and a screw fastener received in a passage of the second carriage for urging the clamping member against a confronting wall of the first carriage, to thereby secure the second carriage to the first carriage.

4. The framework of claim 1, and further comprising a clamping mechanism for detachably securing the carriage to the second beam, said clamping mechanism including a clamping member swingably mounted to the carriage and a screw fastener received in a passage of the carriage for urging the clamping member against a flank of the second beam confronting the clamping member, to thereby secure the carriage to the second beam.

5. The framework of claim 1, wherein the carriage is of a generally U-shaped configuration.

6. A base beam for use in a horizontal and vertical, rod-like framework for clamping workpieces to be measured; said base beam comprising:
    a main body defined by a substantially square cross section and having drawn-in flanks formed centrally with a rib; and
    a first carriage detachably securable on the main body for displacement longitudinally in direction of the main body, said first carriage having at least one side formed with at least one bore; and
    a second carriage detachably secured to the first carriage for displacement transversely to the main body; and
    a clamping mechanism disposed in the bottom and including a swingable clamping member for cooperation with at least one screw fastener; said second carriage having at least one side formed with at least one bore, a connector kit attachable to at least one end face of the main body for coupling the base beam to a conventional precision-bored beam; and wherein each of said first and second carriages has a bottom side of half-dovetailed configuration.

7. A beam for formation of a framework; said beam comprising:
    a hollow main body having opposite end faces adapted for attachment to another beam; and
    a first carriage detachably securable on the main body for displacement longitudinally in direction of the main body, said first carriage having at least one side formed with at least one bore to allow attachment of a workpiece;
    a second carriage detachably secured to the first carriage for displacement transversely to the main body, said second carriage having at least one side formed with at least one bore to allow attachment of a workpiece;
    a connector kit attachable to at least one of the end faces of the main body for coupling the beam to the other beam, said clamping mechanism including a clamping member swingably mounted to the first carriage and a screw fastener received in a passage of the first carriage for urging the clamping member against a confronting flank of the main body, to thereby secure the second carriage to the main body.

8. The beam of claim 7 wherein the main body is defined by s substantially square cross section and has drawn-in flanks formed centrally with a rib.

* * * * *